United States Patent [19]
Dorey et al.

[11] 4,146,668
[45] Mar. 27, 1979

[54] POLYIMIDE MOLDED TOOL FOR GRIPPING HOT GLASSWARE

[75] Inventors: Roger J. Dorey, Harpenden; Gabriel Gavrielides, Hemel Hempstead, both of England

[73] Assignee: United Glass Limited, Middlesex, England

[21] Appl. No.: 745,812

[22] Filed: Nov. 29, 1976

[30] Foreign Application Priority Data

Dec. 4, 1975 [GB] United Kingdom .............. 49838/75

[51] Int. Cl.² .......................... B32B 5/16; B25J 15/00
[52] U.S. Cl. ..................................... 428/283; 428/290; 428/302; 428/323; 428/395; 428/368; 428/378; 428/396; 428/407; 428/448; 428/451; 428/474; 428/538; 428/367; 428/408; 264/258; 264/DIG. 61; 264/57; 156/242; 260/42.44; 432/249

[58] Field of Search ............... 428/474, 538, 368, 378, 428/396, 407, 448, 451, 367, 408, 283, 290, 302, 323; 264/258

[56] References Cited

U.S. PATENT DOCUMENTS

| | | | |
|---|---|---|---|
| 3,301,742 | 1/1967 | Noland et al. ...................... | 428/367 |
| 3,323,945 | 6/1967 | Hechelhammer et al. ...... | 428/396 X |
| 3,416,994 | 12/1968 | Chalmers et al. ................... | 428/474 |
| 3,585,094 | 6/1971 | Ruggles ............................ | 428/542 X |
| 3,671,285 | 6/1972 | Prescott ............................. | 428/367 |
| 3,676,200 | 7/1972 | Rembold et al. ................ | 428/367 X |
| 3,681,187 | 8/1972 | Bowen et al. ....................... | 428/367 |
| 3,755,061 | 8/1973 | Schurb ............................. | 428/378 X |
| 3,847,878 | 11/1974 | Hanson et al. ..................... | 428/474 X |
| 3,962,524 | 6/1976 | Miyamoto et al. ................. | 428/474 |

Primary Examiner—P. C. Ives
Attorney, Agent, or Firm—Cushman, Darby & Cushman

[57] ABSTRACT

A moulding material is described, comprising a polyimide resin and a carbon filler, e.g. carbon fibres and/or graphite. The material is for manufacturing shaped articles for handling hot ware, e.g. hot glassware.

10 Claims, No Drawings

POLYIMIDE MOLDED TOOL FOR GRIPPING HOT GLASSWARE

This invention relates to the handling of hot glassware and other hot formed products, and is especially concerned with the provision of new and improved materials for this purpose.

In the manufacture of glassware by automatic processes the molten glass issuing from the furnace is formed in a machine into the desired shape, and may then be transferred to a conveyor whence it is subsequently transferred into an annealing oven. While the glass is at an elevated temperature, and is being handled on conveyors and by transfer equipment such as pusher bars and gripping and lifting devices, the glass surface is extremely sensitive to damage by a hard or abrasive material. Furthermore the use as a handling device of a material of high thermal conductivity which may cause sudden cooling of the glass surface could result in the presence of small cracks in the glass surface. It is currently common practice to use asbestos or asbestos-based materials to handle glass when it is at temperatures in the region of 400 to 600° C. for, despite the fact that these materials may be sufficiently hard to cause some abrasion damage to the glass, their low thermal conductivity ensures that thermal shock cracking can be avoided. The industry is nevertheless constantly researching for new material which will enable hot glassware to be handled with the minimum of abrasion and thermal damage.

Similar considerations apply in other industries handling hot formed products e.g. ceramics, metals etc. In these cases the criteria may be of avoiding damage to the product or of avoiding marking such as may occur by the use of graphitic materials. It is therefore the object of this invention to provide a material or materials capable of handling hot glassware at all temperatures up to the highest in general use (normally not more than 700° C.) without thermally shocking the ware or damaging the glass surface, or of handling other hot formed products which require thermally resistant lubricious handling materials which do not mark the product. Such a material is produced, according to the invention, by moulding a composition containing a polyimide resin and one or more carbon fillers.

Thus, in its broadest aspect, the present invention provides a moulding material comprising a polyimide resin and a carbon filler.

The invention also provides a method of forming a shaped product which comprises forming into shape a moulding material as above, and post-curing the polyimide resin.

Polyimides are well known commercially available resinous materials, and most of the available ones are of the thermosetting type. A typical such resin, especially useful in the present invention, is that sold under the trade name "Kinel 601". In forming a shaped product using such materials the moulding material is first of all formed into shape, and is then "post-cured", i.e. the resin is cured under heat and pressure. When the polyimide resin is of the thermoplastic type, and such resins are also suitable for use according to the invention, "curing" will normally be carried out by heating the moulding material to an extent to cause the resin to soften and flow, to produce a homogenous product, after which the product will be cooled to set the resin.

The moulding material of the invention suitably comprises between 30 and 70% by weight of polyimide, preferably 45–60% on the same basis. The carbon filler or fillers may comprise carbon fibres, graphite, or any mixture thereof. Typical moulding compositions comprise by weight:

(a) 45% polyimide resin, 30% graphite and 25% carbon fibre;
(b) 55% polyimide resin, 35% graphite and 10% carbon fibre;
(c) 60% polyimide resin, and 40% graphite.

The presence of additional fillers in the composition, additional that is to the carbon fillers, is not excluded, although it will be appreciated that any additional filler must be sufficiently soft as not to damage the handled glass by abrasion.

The composite material made by moulding materials according to the invention is rigid, and if made in sufficient thickness may be used directly for hot glass contact purposes. In some cases, however, the mechanical strength of the material may not be sufficient for prolonged use under normal working conditions and in these cases the material may be bonded or attached mechanically to a metal backing plate. In these cases, however, the use of a metal backing plate may increase the overall thermal conductivity to an undesirable value. It may thus be advantageous to provide, in accordance with a further aspect of the invention, a laminated composite moulding of reduced thermal conductivity, but which contains a mechanically strong layer of glass fibre-reinforced polyimide, as well as a layer of carbon fibre reinforced polyimide, the latter layer providing the contact surface with the hot glass. For this purpose, the layers are best produced by impregnating glass fibre and carbon fibre mats respectively with polyimide resin dissolved in a suitable solvent e.g. methyl pyrrolidone. For treating the glass fibre layer the resin solution may also contain in suspension a suitable filler, e.g. magnesite, while for appropriate treatment of the carbon fibre layer the resin solution may contain a suitable lubricant e.g. graphite in suspension.

Normally speaking the handling materials of this invention will be formed as flat sheets or slabs which may then be cut and/or machined into the desired shape, for use, for example, as linings for glass gripping devices, facing materials for lehr pushers and contact surfaces for glass handling conveyors. Alternatively, these appropriate shapes may be produced by direct compression moulding using a suitably shaped mould. In the normal method of compression moulding these composites the carbon fibres will be oriented preferentially in a plane perpendicular to the major direction of compression, that is, in a flat sheet they will normally be aligned in the plane of the sheet. We have found, however, that when these materials are exposed to hot glassware so that the fibres are perpendicular to the tangent at contact with the glassware, then the materials demonstrate maximum resistance to wear. Accordingly, in designing parts for handling hot glass it is advantageous to ensure that contact with the hot glass takes place at a surface which was perpendicular to the plane of the sheet when originally pressed. In other words, we prefer that in an article handling tool having an article-contacting surface provided by a moulding according to the invention, the carbon fibres should be aligned substantially normal to the plane of the article contacting surface.

While the use of the composite material of the invention has been described with particular reference to the handling operations involved in the manufacture of glassware, it will be appreciated that such materials can easily be used in any situation where hot glass is handled, e.g. in the re-working of glass, and also in situations where other hot materials e.g. ceramic, metal, etc. are handled and which require materials for handling which will not damage or mark the product being handled.

The following Examples are given to illustrate the invention.

EXAMPLE 1.

A material, designated CPKO4, was prepared by extrusion compounding a composition containing, by weight, 45% of polyimide resin (Kinel 601), 30% graphite powder, and 25% carbon fibre. Fifteen hundred grammes of the moulding powder were placed in the cavity of a mould so as subsequently to provide a plate 300 × 300 × 10 mm. The mould had previously been heated to 200° C., and after insertion of the moulding powder pressure of 4,000 psi was applied for 40 minutes, during which time the temperature was raised to 250° C. Subsequently the pressure was removed, the temperature allowed to fall to 200° C. and the moulding ejected. The material was then post-cured at 250° C. for 24 hours. The material so obtained was a rigid, lubricous solid which could be cut and machined. Pieces were cut corresponding to the shape of dual sweep out arms on the so-called "IS" bottle forming machines, which are used to push glassware from the machine onto a moving conveyor. The sweep out arms were fitted to an "IS" machine and operated for at least 900 hours without any evidence of failure. During this time the bottles handled by this material were free from abrasive damage and thermal shock cracks of the type caused by conventional handling materials.

EXAMPLE 2.

A moulding composition (code no. TKO1) was prepared containing, by weight, 60% polyimide (Kinel 601) and 40% graphite. Another moulding composition (TKO2) was prepared containing, by weight, 35% polyimide (Kinel 601) and 65% glass fibre. A sandwich composite consisting of two outer layers of TKO1 and an inner layer of TKO2 was prepared as follows. 450 gms of TKO1 material were placed into the mould cavity referred to in Example 1, and in this instance the mould was only heated to 90° C. A pressure of 2,500 psi was then applied for one minute to compact the layer, the press removed and 1,400 gms of TKO2 moulding powder, which had been previously heated at 120° C. for twenty minutes, were placed into the cavity on top of the moulded layer of TKO1. Pressure was again applied at 2,500 psi, this time for two minutes, the press again removed and a further 450 gms of TKO1 placed into the cavity. The press was then closed again and a pressure of 4,000 psi applied, the pressure being maintained for fifty minutes during which time the mould was heated up to 250° C. Subsequently the pressure was removed the mould cooled to 200° C. and the moulding ejected. This material was then post-cured at a temperature of 250° C. for 24 hours. The material produced was a rigid lubricious solid of substantial mechanical strength. Pieces were cut out and bolted (using recessed bolts) to metal backing plates for fitting onto individual sweep out arms on "IS" bottle forming machines. The sweep out arms were fitted to an "IS" machine and operated for 93 hours without any evidence of failure of the material. During this time the bottles handled by this material were free from abrasive damage and thermal shock cracks of the type caused by conventional handling materials.

EXAMPLE 3.

A moulding material was prepared as described in Example 1, except that the composition contained, by weight, 55% polyimide resin (Kinel 601), 35% graphite powder and 10% carbon fibre. The carbon fibre was of the low modulus kind and had been chopped to lengths between 3 and 6 mm. The material was moulded as described in Example 1. Several strips of widths 10 mm were cut from the formed plate, the method of cutting being chosen so that some of the strips could be mounted such that the face contacting the hot glass was originally parallel to the major plane of the plate, while in other cases the contact face was perpendicular to the major plane of the plate. These pieces were set into channels on a metal backing plate and mounted so that they would push bottles from a cross-conveyor into the annealing lehr. It was observed that pieces which had been cut so that the contact face originally parallel to the major plane of the plate only lasted a few days before visible wear and pitting had occurred. In the case of the strips with the contact face originally perpendicular to the major plane of the plate a life of several weeks was obtained before wear and pitting made it necessary to remove the composites.

EXAMPLE 4.

A solution (I) was prepared by dissolving 1 kg of polyimide resin (Kinel 601) in 1 litre of N-methyl pyrrolidone. Another solution (II) was prepared by dissolving 700 gms of polyimide resin (Kinel 601) in 1 litre of N-methyl pyrrolidone, and then, while stirring, progressively introducing 300 gms of graphite powder (Rocol X7119). Solution I was used to make a "prepreg" based on a glass fibre material, and for this purpose a glass cloth (181E) was used. Solution II was used to prepare a "pre-preg" based on carbon fibre material, and for this purpose a carbon fibre felt (Sigrotherm KFB2) was used. Impregnation, in both cases, was carried out using an impregnating tower machine in a conventional manner. After impregnating, the fabrics were dried in a well ventilated oven to reduce the solvent content. The "pre-pregs" were then moulded to provide a laminate consisting of 5 mm of glass fibre material and 1.5 mm of carbon fibre material. An appropriate number of the glass fibre and carbon fibre "pre-pregs" (to provide the pre-determined thicknesses) were stacked between two sheets of aluminium foil, and the whole placed in a press, between platens which were maintained at a temperature of 120° C. A pressure of 500 psi was applied, and the temperature then progressively increased to 180° C. over thirty minutes while maintaining pressure. The laminate was then held under pressure for one hour at 180° C., and the pressure subsequently released. The laminate was removed from the press and placed in a well ventilated oven maintained at 250° C. for 24 hours in order to post-cure the resin. The composite produced was cut, machined and drilled to serve as in a dead plate on which hot bottles were placed directly from a forming machine. (The bottle-contacting surface was a carbon-fibre layer surface). This dead plate was in use for several months before sufficient wear had taken place necessitating its removal. During the period of its service any contamination with oil which occurred from time to time could be readily removed since the oil did not become absorbed into the material of the deadplate, and the bottles thereby placed upon the dead plate were less subject to acquiring marks on the bottom than would be the case when an asbestos based dead plate was used. Equally, the relatively low thermal conductivity of the composite prevented cracks occurring on the base of the bottles, a feature which was common when metal dead plates were used.

What we claim is:

1. A tool for gripping hot articles wherein the article contacting surface is provided by a product formed by moulding a composition consisting essentially of a polyimide resin, graphite powder and carbon fibres, the fibres being aligned in a plane substantially normal to the plane of the article contacting surface.

2. A tool as claimed in claim 1 wherein the polyimide resin is present in an amount of 30 to 70% by weight, based on the total weight of the composition in said shaped product.

3. A tool as claimed in claim 2 wherein the polyimide resin is present in an amount of 45–60% by weight.

4. A tool as claimed in claim 2 wherein said shaped product consists of, by weight, 45% polyimide resin, 30% graphite and 25% carbon fibre.

5. A tool as claimed in claim 2 wherein said shaped product consists of, by weight, 55% polyimide resin, 35% graphite and 10% carbon fibre.

6. A tool according to claim 1 prepared by a process including the step of post-curing the resin after moulding the composition.

7. A tool according to claim 1 wherein the article-contacting surface is provided by a carbon-reinforced polyimide resin layer of a laminate prepared by (a) impregnating a carbon fibre substrate with a solution of a polyimide resin containing graphite powder to form a first pre-preg, (b) impregnating a glass fibre substrate with a solution of a polyimide resin to form a second pre-preg, (c) superposing the first and second pre-pregs and (d) subjecting the superposed pre-pregs to heat and pressure.

8. A tool for contacting hot articles which is made by either (a) compression moulding a composition consisting essentially of carbon fibres, graphite powder and a polyimide resin into a shaped form or (b) compression moulding a material consisting essentially of a carbon fibre mat impregnated with a polyimide resin and graphite powder into a shaped form;

cutting the shaped form from (a) or (b) into strips and turning the strips through 90° so that the faces formed by the cutting provide the article-contacting surface of the tool.

9. A tool according to claim 8 which is made by compression moulding a composition consisting essentially of carbon fibres, graphite powder and a polyimide resin into a shaped form, cutting the shaped form into strips and turning the strips through 90° so that the faces formed by the cutting provide the article - contacting surface of the tool.

10. A tool according to claim 8 which is made by compression moulding a carbon fibre mat impregnated with a polyimide resin and graphite powder into a shaped form, cutting the shaped form into strips and turning the strips through 90° so that the faces formed by the cutting provide the article - contacting surface of the tool.

* * * * *